United States Patent [19]

Frank

[11] 4,091,787
[45] May 30, 1978

[54] IGNITION DEVICE FOR INTERNAL COMBUSTION ENGINES

[75] Inventor: Gunter Frank, Bensheim, Germany

[73] Assignee: Kyberna GmbH, Bensheim, Germany

[21] Appl. No.: 702,768

[22] Filed: July 6, 1976

[30] Foreign Application Priority Data

Jul. 3, 1975 Germany .............................. 2529724

[51] Int. Cl.² ............................ F02P 5/04; F02P 1/00
[52] U.S. Cl. .............................. 123/148 E; 123/117 R
[58] Field of Search ..................................... 123/148 E

[56] References Cited

U.S. PATENT DOCUMENTS

| 3,926,165 | 12/1975 | Merrick | 123/148 E |
| 3,926,557 | 12/1975 | Callies et al. | 123/148 E |
| 3,945,362 | 3/1976 | Neuman | 123/148 E |

Primary Examiner—Ronald B. Cox

Attorney, Agent, or Firm—Stevens, Davis, Miller & Mosher

[57] ABSTRACT

An ignition system for an internal combustion engine is disclosed including an ignition timing pulse generator for providing an output pulse which is a function of the angular position of the engine cylinder, and a control circuit, responsive to such output pulse, including another pulse generator comprising an astable multivibrator for turning on and off at least one switching transistor coupling a DC voltage source to the ignition transformer. The switching frequency of the transistor is determined by the control circuit to control the start, end and duration of the ignition power. The control circuit can vary, in a continuous manner, the duration of the ignition power and the switching frequency as a function of the characteristics of the internal combustion engine and its environment.

9 Claims, 6 Drawing Figures

IGNITION DEVICE FOR INTERNAL COMBUSTION ENGINES

This invention relates to an ignition system for internal combustion engines of such design that a direct current (DC) source may be applied through one or several transistors acting as switch(es) to the ignition transformer and that the switching frequency of the transistor(s) is determined by a pulse generator, preferably an astable multivibrator. This pulse generator may be switched on or off depending on the angular position of the crankshaft or that of the piston in the engine cylinder or on some other parameter acting as a timing component so that the beginning, end and duration of the generation of the ignition power may be freely varied and that in comparison with known ignition systems, very large and arbitrarily variable ignition powers can be achieved.

It was found that numerous applications made a control circuit desirable by means of which the duration of the generation of the ignition power and the switching frequency may be varied in a practically continuous manner as a function of the characteristics of the internal combustion engine and its environment. Especially high requirements regarding freedom from electrical interference, temperature resistance and stability for the set values and economy occurring under certain conditions of use were required.

The present invention addresses the task of replacing an embodiment of the control circuit of the ignition system described in U.S. Pat. No. 3,926,557 in which a change in the duration of the generation of the ignition power and the switching frequency as a function of the characteristics of the internal combustion engine and its environment takes place in steep steps by a control circuit in which changing the duration of the generation of the ignition power and the switching frequency as a function of the characteristics of the internal combustion engine and its environment takes place in a practically continuous manner. Furthermore, the freedom from external electrical interferences, the temperature stability, and the temperature-resistance and economy should be increased.

To solve this problem, the present invention includes a unique control circuit such that the switching component comprises four back-triggered monostable multivibrators, and one resistance, one capacitance and one logic circuit being used in common for all four back-triggered monostable multivibrators. The multiple timing element of the present invention consists of three R-C links (capacitor-resistance-links), one logic $O_R$ circuit made from discrete components, one voltage divider, one further R-C link and one further logic circuit. Finally the pulse generator of the present invention consists of an astable multivibrator, two additional logic circuits and one capacitor.

FIGS. 3a – 3h are pulse diagrams;
FIGS. 4a – 4h are pulse diagrams;
FIGS. 5a – 5h are pulse diagrams, and
FIGS. 6a – 6h are pulse diagrams.

Figure 1:
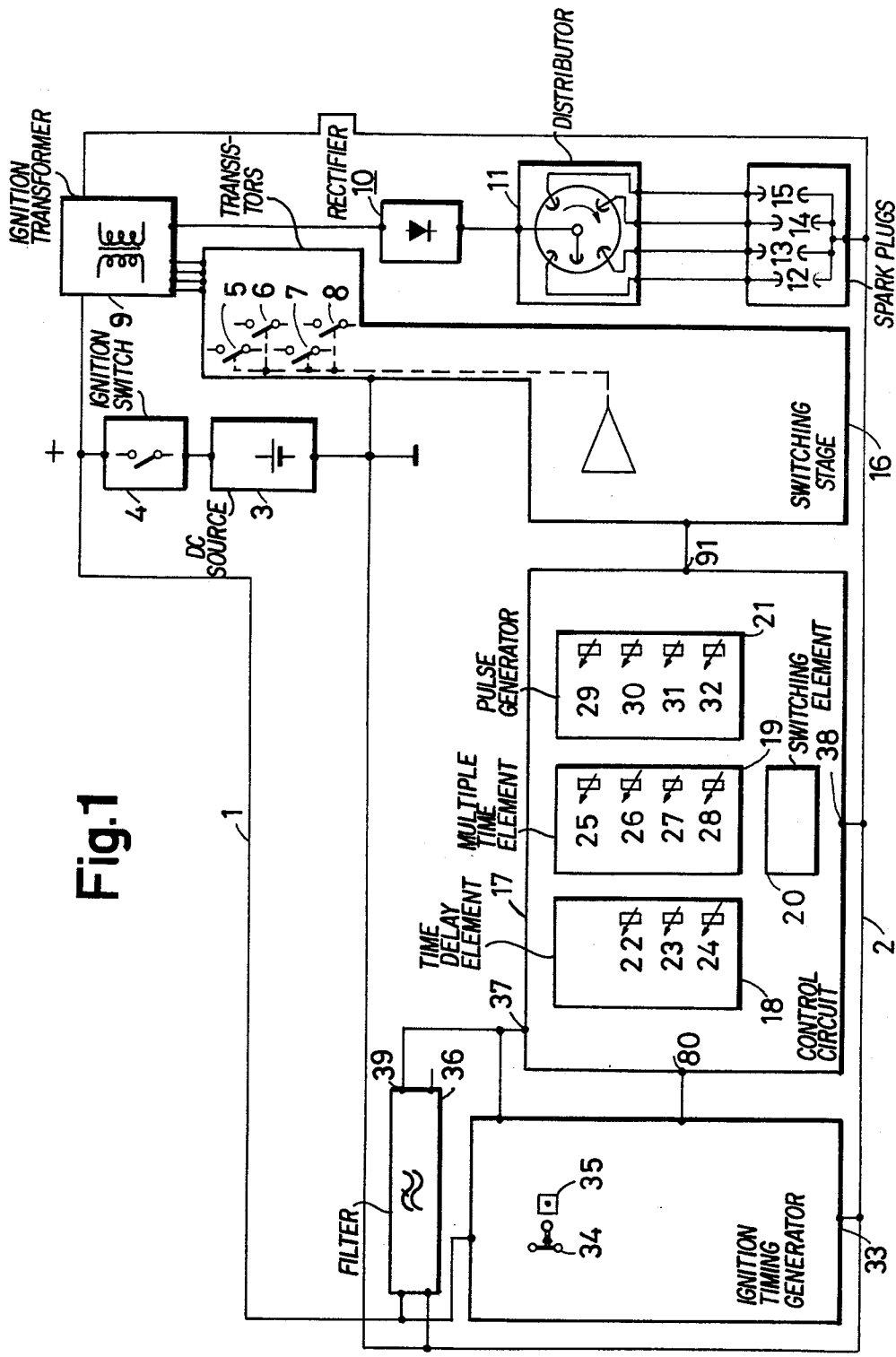
FIG. 1 is a block circuit diagram of the ignition system.

FIG. 1 shows the DC source 3, for instance a battery, an ignition switch 4, and transistors 5, 6, 7, 8 acting as switches, their number corresponding to that of the primary coils of ignition transformer 9. On the secondary side of ignition transformer 9, the high-voltage alternating current (AC) potential is fed to a rectification system 10 and through the mechanical ignition distributor 11 to spark plugs 12 through 15. An electronic ignition distributor may replace the mechanical ignition distributor 11.

This ignition which generates and delivers very high ignition powers and allows variation within a width of limits not achieved heretofore the duration, beginning and end of the arc produced by the spark plugs, is particularly well suited to the introduction of, that is, controlled by the setting of values which are the characteristics of the operation of the internal combustion engine and its environment. These setting values or magnitudes are applied to adjustment links indicated or summarized in the block circuit diagram of FIG. 1 as follows. Element 16 comprises transistors 5, 6, 7, 8 with associated power amplification for switching voltage to the primaries of ignition transformer 9. Control circuit 17, consisting of the time element 18, a multiple time delay element 19, a switching element 20 and a pulse generator 21, comprises adjustment elements which in the embodiment includes potentiometers 22 through 24 associated with setting values which depend for instance on the throttle valve, the engine rpm and the nature of the gasoline-air ratio; control circuit 17 also comprises adjustment elements which in the embodiment are potentiometers 25 through 28 associated with time element 19 and 29 through 32 associated with pulse generator 21, which for instance depend on the throttle valve, the ignition timing, the engine rpm and the nature of the gasoline-air ratio. Element 33 represents an ignition timing generator connected with an interrupt switch 34 and a cam 35. Element 36 represents a filter element consisting of a choke, capacitors, a compensating resistor and a zener diode; its purpose is to prevent superimposed interferences in the DC voltage supply from affecting the feed line of the ignition timing generator 33 and control circuit 17.

As already indicated, the present invention improves on the invention disclosed in U.S. Pat. No. 3,926,557 by the use of the control circuit 17. Except for multiple time element 19, switching element 20 and pulse generator 21, all of the other elements shown in FIG. 1 of the present invention are disclosed in more detail in this patent, particularly, for example, with respect to FIGS. 2 and 15 thereof. A detailed explanation of these other elements is therefore not required for an understanding of the present invention.

Figure 2:
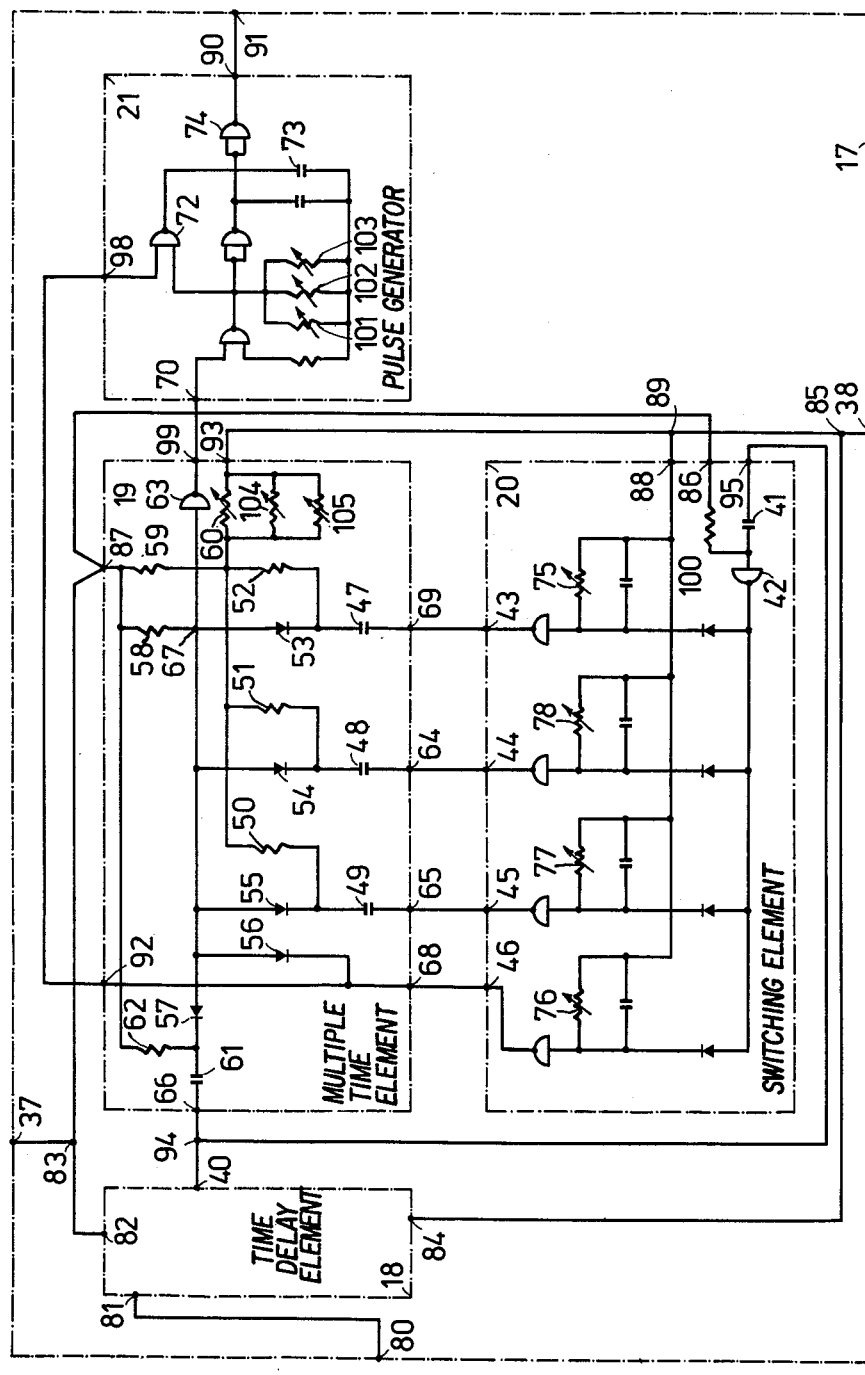
FIG. 2 is a circuit diagram of the control circuit of the invention.
Figure 3:
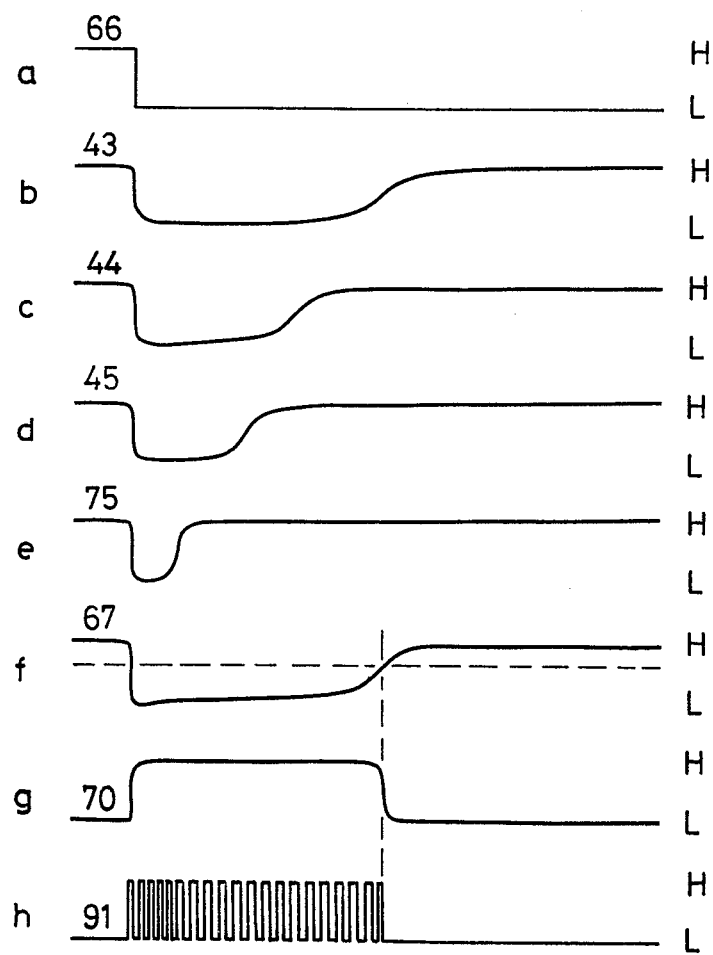

FIG. 2 shows control circuit 17 of the present invention, which replaces the prior art control circuit. It consists of time-delay element 18, switching element 20, multiple time element 19 and pulse generator 21. Junction 37 of circuit 17 is at a positive potential, junction 38 is at a negative potential, both being fed from the supply voltage.

Figure 4:
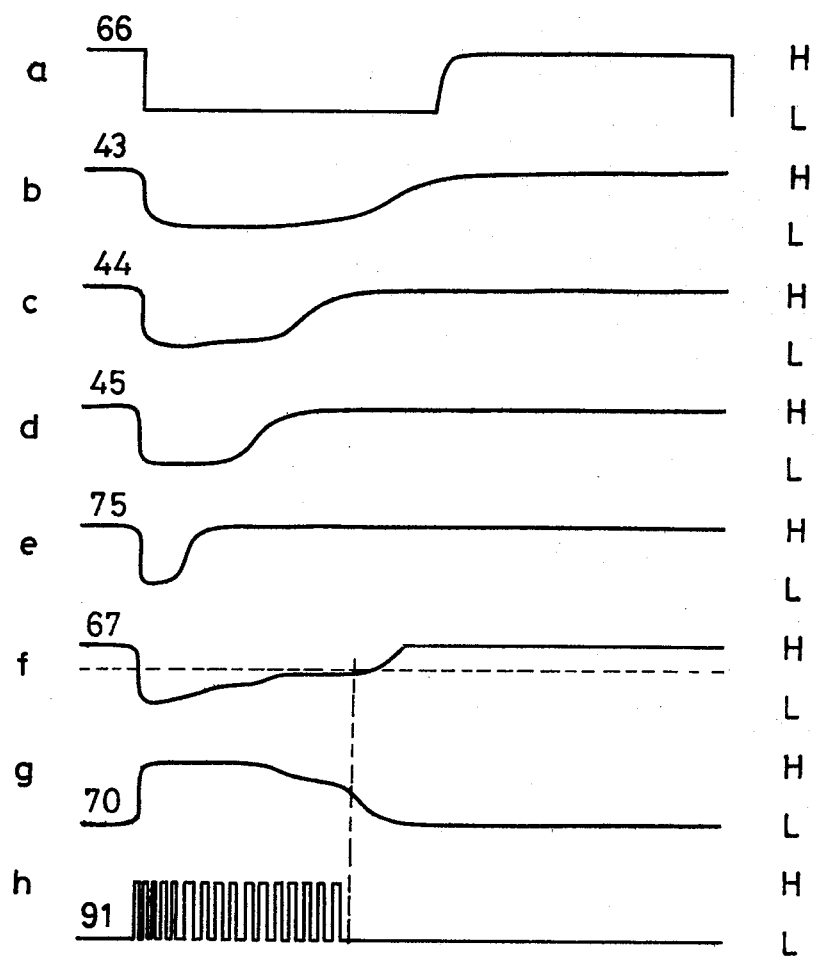
Figure 5:
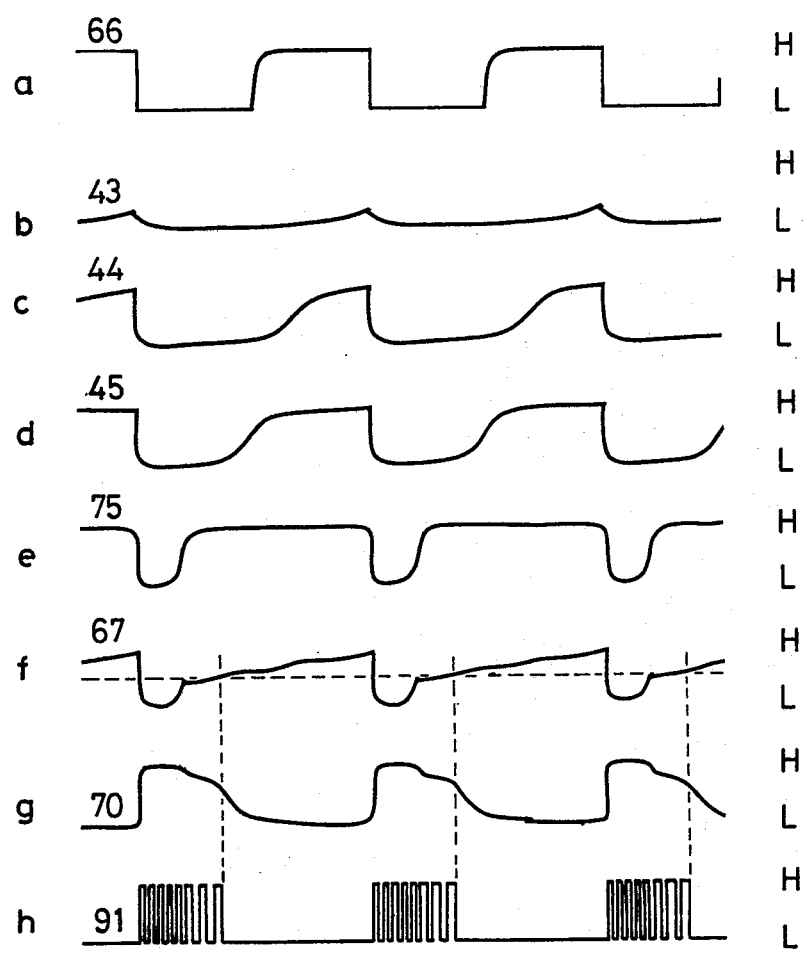
Figure 6:
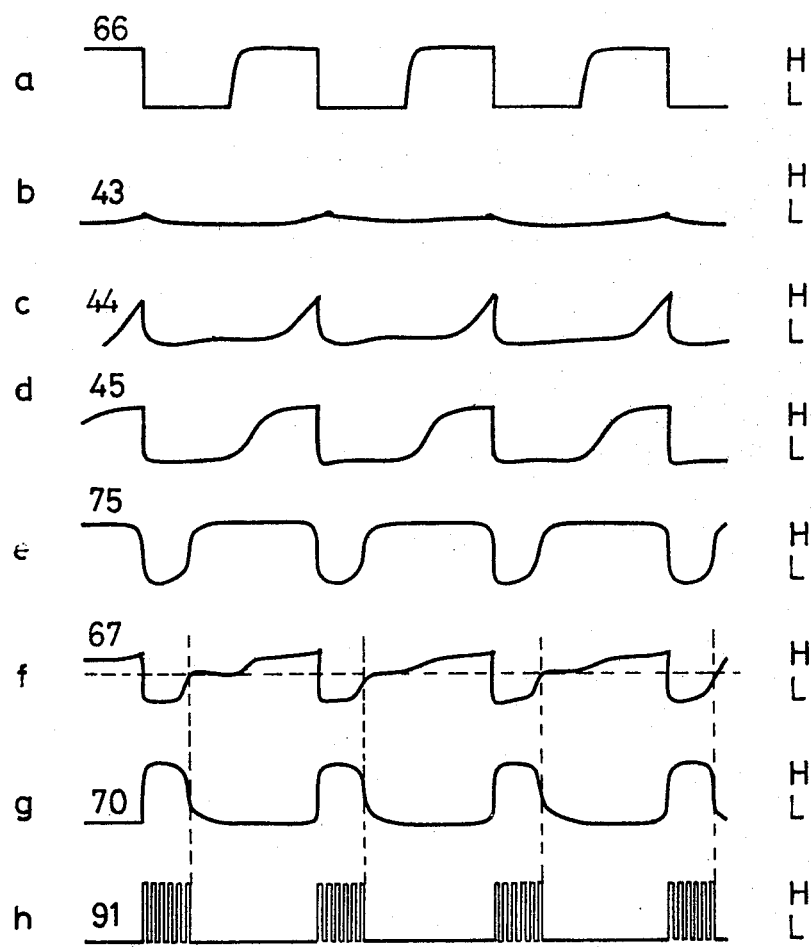

To better explain FIG. 2, pulse diagrams are shown in FIG. 3a–3h; 4a–4h; 5a–5h and 6a–6h. These diagrams show the corresponding pulses at the designated switching points with respect to four engine rpms. FIG. 3 corresponds to 150 rpm. FIG. 4 to 1,500 rpm, FIG. 5 to 3,750 rpm and FIG. 6 to 5,000 rpm of an 8-cylinder engine.

Switching element 20 consists of several back-triggered, monostable multivibrators, known per se, in the example, resistance 100, capacitance 41 and logic circuit 42 are associated with each of the four back-triggered, monostable multivibrators.

The monostable multivibrators of switching element 20 are controlled from the time delayed output pulse of time element 18 representing a pulse from the ignition timing generator, via the connection of junction 40, connection 94 and junction 95. The duration of the output pulse from the monostable multivibrators of switching element 20 will vary. If the time-spacing between two input pulses at junction 95 of switching element 20 is less than the duration of the output pulse from one or several monostable multivibrators of switching element 20, then their outputs 43, 44, 45, 46 will remain in the quasi-stable state. If however the time-spacing between two input pulses at junction 95 of switching element 20 is larger than the duration of the pulse from one or several monostable multivibrators of switching element 20, then each of these monostable multivibrators will apply its output pulse to the multiple time element 19. Four rpm values are determined by means of potentiometers 75 through 78, a change in the duration of generation of ignition power and of switching frequency being carried out at said values.

Multiple-time element 19 consists of several so-called RC links (capacitor-resistor links). In the example shown there are four links namely capacitors 47, 48, 49, 61 and resistors 50, 51, 52, 62; element 19 also consists of a logic OR circuit with five inputs consisting of diodes 53, 54, 55, 56, 57, and a resistance 58, a the voltage divider consisting of resistors 59, 60, and RC link consisting of capacitor 61 and resistor 62, and a logic circuit 63.

Several RC links, three in the example, obtain their input pulses from switching element 20 via input junctions 69, 64, 65. One RC time element of the multiple link 19 obtains its input pulse directly from time element 18 via junctions 40, 94, 66. The output signals of all RC links of the multiple timing element 19 are connected together through the logic OR circuit elements 53 through 58. The signal at point 67 of the logic OR circuit is formed from the input signals at junctions 69, 64, 65, 68, 66 via RC links 47, 48, 49, 61, 50, 51, 52, 62. The signal at point 67 arrives at logic OR circuit 63, the transfer-characteristic of which is used as the trigger threshold. Therefore, logic circuit 63 acts as an inverting Schmitt trigger circuit known per se. A pulse of variable width is thereby generated at the output of the multiple time element 19 at junction 99. Logic circuit 63 also may be replaced by a circuit with discrete components or by a circuit with operational amplifiers.

Potentiometers 101, 102, 103 are used to set the adjustment values, i.e., ignition time point, position of the throttle and nature of the gasoline air ratio.

The output junction 99 of the multiple time element 19 is connected to the input junction 70 of pulse generator 21. The latter consists of an astable multivibrator known per se, a logic circuit 72, a capacitor 73 and a logic inverter circuit 74. Pulse generator 21 may be switched to two different frequencies. As long as a signal is applied to the input junction 70 of pulse generator 21, the monostable multivibrator will oscillate at a definite frequency. If in addition a signal is applied to junction 98 of pulse generator 21, capacitor 73 will be switched off and the astable multivibrator will oscillate at another frequency.

Potentiometers 101, 102, 103 are used to set the adjustment values, i.e., ignition time point, position of the throttle and nature of the gasoline-air ratio.

The input junction 80 of control circuit 17 leads to input junction 81 of time element 18, which is connected through junction 82, point 83 and output junction 37 to the positive potential, and through junction 84, point 85 and output junction 38 to the negative potential. The output junction 40 of time element 18 passes through point 94 to input junction 66 of multiple time element 19. The output junctions 43, 44, 45, 46 of switching element 20 are connected with input junctions 69, 64, 65, 68 of multiple time element 19. Switching element 20 is connected by output junction 86 through points 87, 83 and via output junction 37 of control circuit 17 to the positive potential of the supply voltage. The output junction 88 of switching element 20 is connected through points 89, 85 and via output junction 38 of the control circuit 17 with the negative potential of the supply voltage. The output junction 99 of multiple time element 19 is connected to the input junction 70 of pulse generator 21, the output junction 90 of which leads to junction 91 of control circuit 17. The output junction 92 of the multiple time element 19 is connected to the input junction 98 of pulse generator 21. Input junction 93 of the multiple time element 19 is connected to the negative potential through points 89, 85 and junction 38.

The logic shown relates to integrated circuits of the C-MOS technology (Complementary Metal Oxide Semiconductors). The positive and negative logic reference points of the integrated circuits have been omitted.

In lieu of the individual resistors 75 through 78 and 101 through 103, 60, 104 and 105 shown in the example, other arbitrary combinations of resistances, for instance resistors connected in parallel or series, may be used. Linear resistances may be fixed ones, variable ones, or strain-gauges, non-linear resistances may be photo-resistors, or conductors with negative or positive coefficients of temperature, field plates and transistors, as well as combinations of linear and non-linear resistors.

The shown advantages of the present invention with respect to the feasibility of practically continuous variation of the ignition parameters as a function of the combustion process as well as improved protection against interference improved, temperature resistance and stability and greater economy when compared to the control circuit described in U.S. Pat. No. 3,962,557 with its sharp program gradations, are further enhanced by the flexibility of selection in components. As has been described, the circuit of the invention comprising component 63 and using the transfer characteristic as the trigger threshold may also be replaced by an operational amplifier in the Schmitt-trigger circuit for the same operation. In order to widen the latitude of adaptability of the combustion process, the capacitor 73 and also the other shown capacitor and illustrated resistances of pulse generator circuit 21 may be adjustable. With respect to the design, in addition to optimally matching the ignition parameters to the combustion process in switching frequency, there also is the possibility of optimizing the high output voltage to the secondary current by means of the transfer characteristic of the ignition transformer.

I claim:

1. An ignition system for an internal combustion engine comprising timing means for providing a first output signal which is a function of the angular position of the crankshaft or of the position of a piston in a cylinder of said engine, a pulse generating control means responsive to said first output signal for providing switching signals, and a switching means responsive to said switching signals for connecting a DC voltage source to an ignition transformer, said timing means and pulse generating control means including means for varying the beginning, end and duration of said switching signals, wherein the improvement comprises:

a pulse generating control means comprising a switching element connected to the output of said timing means for providing a plurality of second output signals having different time durations in response to said first output signal, a multiple time element including a plurality of first resistance-capacitance circuits for respectively coupling all but one of said second output signals to a combining circuit, means for coupling said one of said second output signals to said combining circuit, and means for coupling said first output signal to said combining circuit, said combining circuit providing a third output signal having a shape which is a function of the signals combined, and a pulse generator operative in response to the presence of said third output signal for generating said switching signals.

2. An ignition system as in claim 1 wherein said switching element comprises an input terminal connected to receive said first output signal, a first logic circuit having an input connected to said input terminal through a first capacitor, a first resistor connecting said input to a first voltage potential, and a plurality of back-triggered monostable multivibrator circuits connected to the output of said first logic circuit and a second voltage potential for providing said plurality of second output signals.

3. An ignition system as in claim 2 wherein each monostable multivibrator circuit includes control means for continuously varying the shape of a respective second output signal.

4. An ignition system as in claim 2 wherein said combining circuit comprises a plurality of diodes each having a first lead coupled to receive a respective input signal to said combining circuit and having a second lead interconnected with the second leads of all other diodes, a second resistance-capacitance circuit for connecting said first output signal to one of said dioes, a second resistor connected between said interconnection and said first voltage potential, a voltage divider connected to said second resistance-capacitance circuit, and a second logic circuit having an input connected to said interconnected second leads and an output providing said third output signal.

5. An ignition system as in claim 4 wherein said multiple timing means includes control means for continuously varying the shape of at least one of said second output signals which are resistance-capacitance coupled to said combining circuit.

6. An ignition system as in claim 4 wherein said pulse generator comprises an astable multivibrator circuit responsive to the presence of said third output signal for operating at a first frequency, a third logic circuit receiving the output of said astable multivibrator circuit and providing said astable multivibrator circuit output as said switching signals and a fourth logical circuit having a first input conncted to said astable multivibrator and a second input connected to one of said second output signals for causing said astable multivibrator to operate at a second frequency.

7. An ignition system as in claim 6 wherein said astable multivibrator circuit includes control means for continuously varying the shape of the output signal from said astable multivibrator circuit.

8. An ignition system for an internal combustion engine having a crankshaft, a piston-cylinder arrangement, and an ignition timing pulse generator, comprising:

an ignition transformer;

at least one switching transistor;

a DC source for applying a voltage through said transistor to said ignition transformer to provide ignition power; and means for switching said at least one transistor on and off as a function of the angular position of the crankshaft or the position of the piston in the cylinder so that the beginning, end and duration of the generation of the ignition power is freely variable, said switching means comprising a control circuit including:

(i) a time delay element for generating time delayed first output pulses representing the pulses from the ignition timing generator;

ii. a switching element, connected to said time delay element, including four back-triggered monostable multivibrators, a first logic circuit whose output is coupled to said multivibrators, a first capacitor receiving said time delayed first output pulses and connected as one input to said first logic circuit, and a resistor connected to said one input of said first logic circuit between said capacitor and first logic circuit, said multivibrators remaining in a quasi-stable state if the time spacing between two of said first output pulses is less than the duration of a second output pulse of at least one of said multivibrators, said multivibrators each generating a second output pulse if the time spacing between two of said first output pulses is greater than the duration of one of said second output pulses;

iii. a multiple timing element including three R-C links responsive to said second output pulses from three of said multivibrators, a second logic OR circuit including at least three diodes connected to said three R-C links and a first resistor for coupling together third output signals from said R-C links, a fourth R-C link receiving said time delayed first output pulses, a voltage divider connected to said fourth R-C link and to one of said three R-C links, and a third logic circuit responsive to said coupled third output signals and having a trigger threshold to generate fourth output pulses having a variable width in dependence on said coupled third output signals; and (iv) a pulse generator for generating pulses of different frequencies to control said transistor, said pulse generator including means responsive to said fourth output pulses and a second output pulse from one of said multivibrators through said multiple timing element, said pulse generator generating pulses of one frequency if said fourth output pulses are generated and generating pulses of another frequency if both said fourth and said second output pulses are generated, said means of said pulse generator including a capacitor which is switch on to generate pulses of said one frequency and switched off to generate pulses of said another frequency.

9. An ignition system as in claim 8 wherein said multiple timing element further includes a plurality of first control potentiometers coupling said three R-C links to a voltage supply for altering the characteristics of said third output signals, said pulse generator further including a plurality of second control potentiometers for varying the characteristics of said generated pulses, and said switching element further including a plurality of third control potentiometers coupled one each to said back-triggered monostable multivibrators for varying the characteristics of said second output pulses.

* * * * *